(12) United States Patent
Trivedi et al.

(10) Patent No.: US 9,031,856 B2
(45) Date of Patent: May 12, 2015

(54) SYSTEM AND METHOD FOR INTEGRATING ISSUE TRACKING SYSTEMS

(75) Inventors: Prakash Trivedi, Centreville, VA (US); Sachin Garg, Edison, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1405 days.

(21) Appl. No.: 12/138,213

(22) Filed: Jun. 12, 2008

(65) Prior Publication Data

US 2009/0313059 A1 Dec. 17, 2009

(51) Int. Cl.
| | |
|---|---|
| *G06Q 10/06* | (2012.01) |
| *G06Q 10/10* | (2012.01) |
| *G06Q 30/02* | (2012.01) |
| *H04L 29/06* | (2006.01) |
| *G06Q 30/06* | (2012.01) |

(52) U.S. Cl.
CPC .............. *G06Q 30/06* (2013.01); *G06Q 10/06* (2013.01); *G06Q 10/103* (2013.01)

(58) Field of Classification Search
USPC ................. 705/7, 40, 1.1, 5, 7.11, 7.29, 34; 709/202, 201, 238, 245; 370/352; 379/201.01, 207.04
See application file for complete search history.

(56) References Cited

U.S. PATENT DOCUMENTS

| | | | | |
|---|---|---|---|---|
| 6,026,500 | A * | 2/2000 | Topff et al. ..................... 714/26 |
| 6,363,411 | B1 * | 3/2002 | Dugan et al. ................. 709/202 |
| 6,952,836 | B1 * | 10/2005 | Donlan et al. ................ 725/116 |
| 6,957,257 | B1 * | 10/2005 | Buffalo et al. ............... 709/224 |
| 7,848,312 | B2 * | 12/2010 | Zhang et al. ................. 370/352 |
| 2001/0034627 | A1 * | 10/2001 | Curtis et al. ...................... 705/7 |
| 2002/0138427 | A1 * | 9/2002 | Trivedi ............................ 705/40 |
| 2005/0216383 | A1 * | 9/2005 | Kuhn et al. ..................... 705/34 |
| 2007/0070979 | A1 * | 3/2007 | Kim et al. .................... 370/352 |

* cited by examiner

*Primary Examiner* — Matthew Gart
*Assistant Examiner* — Reva R Danzig (57) ABSTRACT

Communication between a first issue tracking system and a second issue tracking system is provided. An integration platform is configured to translate an issue tracking ticket from a form recognizable by the first issue tracking system, which can be a component of a customer network, into a form recognizable by the second issue tracking system, which can be a component of a service provider network. A gateway server is provided to control communications between the integration platform and the issue tracking system of the service provider network.

19 Claims, 6 Drawing Sheets

SYSTEM AND METHOD FOR INTEGRATING ISSUE TRACKING SYSTEMS

BACKGROUND INFORMATION

In today's highly competitive telecommunications industry, service providers provide customer's with a wide variety of voice, data, and video services. In order to ensure that each customer's needs are met, the service providers must have the ability to promptly and efficiently adjust a customer's service based upon the customer's changing needs and resolve problems that arise with the customer's service. Both the customer and the service provider may have infrastructure within their respective networks to track such issues (e.g., a ticketing system that provides a means to track such issues until resolution). However, for reasons of security and incompatibility, such issue tracking systems of the customer and the service provider do not communicate with one another, but rather are maintained as separate systems, which is inefficient and makes the systems susceptible to errors.

Therefore, there is a need for an approach that provides efficient communication between issue tracking systems of a services provider and its customers.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENTS

A preferred apparatus, method, and software for integrating issue tracking systems, for example, of a service provider and one or more of its customers. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
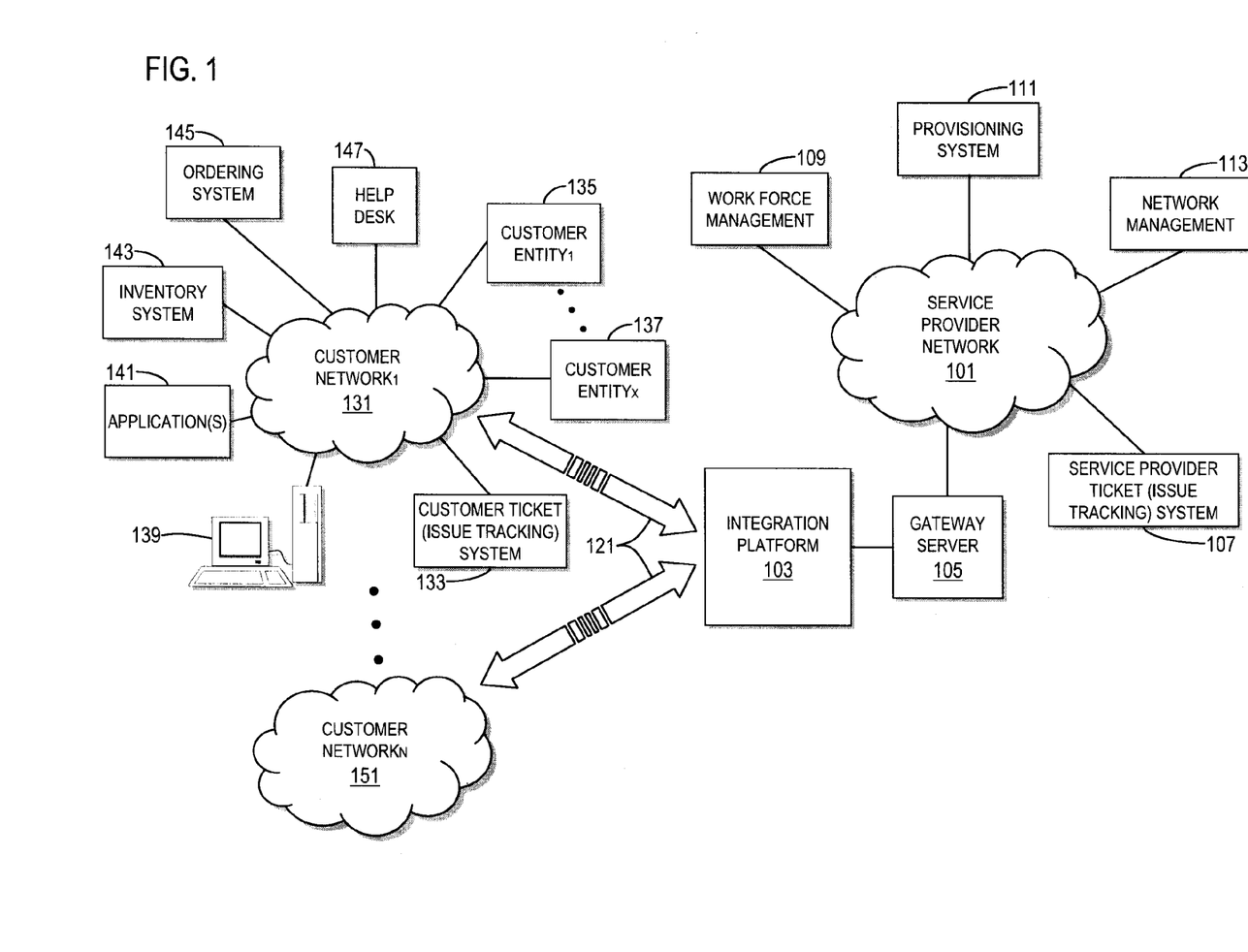
FIG. 1 is a diagram of a service provider network and its customers, including a system capable of integrating issue tracking systems of the service provider and its customers, according to an exemplary embodiment.

FIG. 1 is a diagram of a service provider network and its customers, including a system capable of integrating issue tracking systems of the service provider and its customers, according to an exemplary embodiment. FIG. 1 depicts a service provider network 101 that includes an integration platform 103 and associated gateway server 105, which acts as an authentication, authorization and accounting (AAA) system for customers using the integration platform 103. By way of example, the service provider network 101 may correspond to the infrastructure of a network service provider in support of any type of service, e.g., a data, voice, and/or video. While specific reference will be made herein thereto, service provider network 101 may alternative correspond to any environment that would benefit from integration of issuing tracking systems of such a network and the networks of its customers.

In FIG. 1, the integration platform 103 acts as an interface for issue tracking system(s) of one or more customers to communicate with an issue tracking system (or service provider ticket system) 107 of the service provider network 101. For example, the interface can be in form of a portal or work in conjunction with a portal. The customer network(s) and the integration platform 103 communicate via one or more communication paths 121.

It is noted that network service providers are invariably presented with various infrastructure issues related to repairing lost connections, maintaining existing facilities, and upgrading resources, not to mention continually attempting to provision new accounts and new services for their customers. This inevitably leads to an amount of both expected and unexpected fluctuations in workload demands. As networks geographically expand and grow more technologically advanced, it is becoming a rather complex and onerous task to ensure and supply the right amount of technicians with the appropriate amount of resources (i.e., an enabled workforce) to meet workload demands. Given this prevalence, geographic dispersion, and continual expansion of modern networks, it is becoming evermore challenging for service providers to delicately balance pending and/or predicted jobs (i.e., workload) with technician and/or equipment (i.e., workforce) availability. Moreover, this task is exacerbated by the inherently variable, sometimes unforeseeable nature of service-oriented workloads.

Not only do network service providers have to be reactive and proactive to problems that arise with the services provided to their customers, but also customers needs may constantly be changing, which requires providers perform adjustment to the services provided. In order to keep track of various issues that arise, typically both customers and service providers have developed systems that track such issues, sometimes referred to as "trouble ticket systems." Thus, when an issue arises, whether it be related to a problem with the service provided, or an adjustment that the customer desires, a "ticket" will be issued that will be used to keep tracking of the issue until resolution of the issue. However, for reasons of security, a network service provider may not want to grant customers access to its network to directly communicate with the network service provider's issue tracking system. Also, the issue tracking systems of the one or more customers are typically incompatible with the issue tracking system of the service provider.

As shown, an integration platform 103 is provided that, along with other components, allow the issue tracking system of one or more customers to communicate efficiently with the issue tracking system of the network service provider, in order to ensure that both issue tracking systems are promptly notified of issues that arise and responses to such issues. The exemplary service provider network 101 shown in FIG. 1 includes workforce management system 109 and a provisioning system 111, which are each utilized to address and respond to issues raised by one or more customers of the service provider network 101. The workforce management system 109 and provisioning system 111 will be utilized upon receipt and issuance of a "trouble ticket" by the ticket tracking system 107, and these systems will provide feedback to the ticket tracking system 107 indicating a response to the issue raised in the trouble ticket, and thus the ticket tracking system 107 will update the trouble ticket (e.g., modify the ticket, add a comment to the ticket, issue a response to the ticket, close the ticket upon resolution of the issue, etc.) based on the response proposed or taken by these systems. For example, the workforce management system 109 can allocate the workforce (technicians, etc.) of the network service provider as needed in order to take corrective action in response to a problem raised by the ticket, or to make infrastructure changes to the customer's network based on changes in the customer's needs, etc. The provisioning system 111 can, for example, make changes to service allocations (e.g., bandwidth allocations, etc.) designated for the customer's network based on the issue raised in the ticket. The service provider network 101 also includes a network management system 113 that manages the various applications of the service provider network 101.

In FIG. 1, the integration platform 103 provides an interface for issue tracking system(s) of one or more customers (e.g., customer network$_1$ 131 ... customer network$_N$ 151) to communicate with an issue tracking system (or service provider ticket system) 107 of the service provider network 101. FIG. 1 depicts an example of a customer network$_1$ 131 that includes an issue tracking system (or customer ticket system) 133. The customer network$_1$ 131 can be accessed and utilized by one or more customer entities (e.g., customer entity$_1$ ... customer entity$_X$), which can represent various departments or corporate entities within the customer's business having one or more users, or individual users of the customer's network. The customer network$_1$ 131 includes an administrator or network management system 139, which manages the various applications of the customer network$_1$ 131. The customer network$_1$ 131 can also include one or more applications 141 for use by the various customer entities.

Additionally, the customer network$_1$ 131 includes an inventory system (or asset management system) 143, an ordering system (or order management system) 145, and a help desk (or trouble management system) 147, which are each in communication with the customer ticket system 133. The inventory system 143 can monitor the status of the inventory of the customer network$_1$ 131 in order to determine if changes are needed or problems have arisen with regard to inventory that can be corrected by the service provider. For example, the inventory system 143 can monitor the customer's network elements, including product and service inventory, as well as specific details for each product and service. The order system 145 can provide a platform for ordering new services or making changes to existing services, modifying existing orders, making changes to orders in progress, and obtaining order status and details. The help desk 147 provides a platform for the customer to report issues, such as network faults and outages, as well as customer initiated testing of network services. When issues arise that need to be addressed by the service provider via the inventory system 143, the ordering system 145, and the help desk 147, these systems communicate with the customer ticket system 133, which creates a ticket, modifies an existing ticket, or adds a comment to a ticket. Also, when these systems determine that an issue has been resolved, then they can communicate with the customer ticket system 133 in order to close an existing ticket. Any ticket event that occurs in the customer ticket system 133 is communicated to the integration platform 103 via the communication path 121 for further processing, as will be discussed below.

Figure 2:
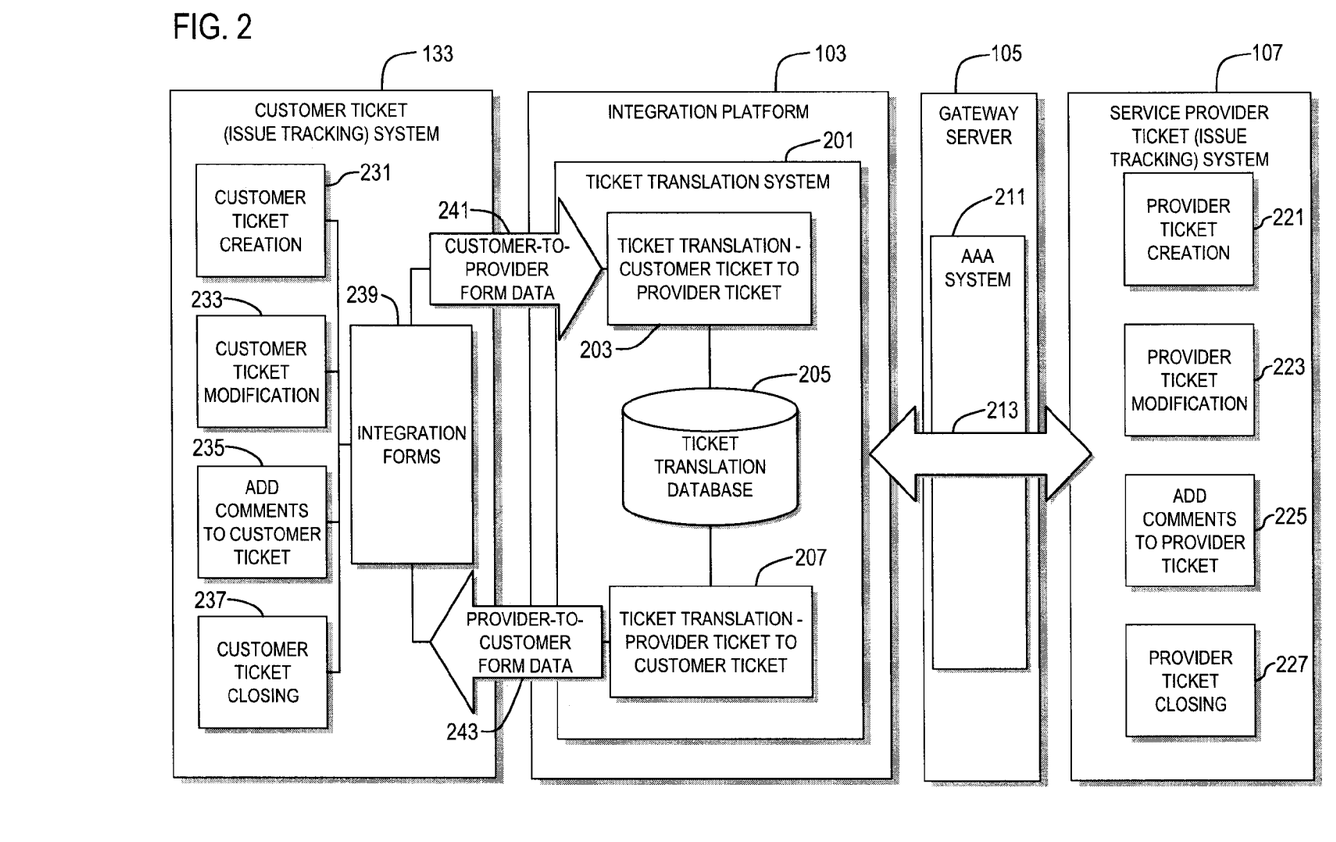
FIG. 2 is a diagram of an integration platform that integrates a customer issue tracking system with a service provider issue tracking system, according to an exemplary embodiment.

FIG. 2 is a diagram of an integration platform that integrates a customer issue tracking system with a service provider issue tracking system, according to an exemplary embodiment. The integration platform 103 and associated gateway server 105 provide a system that allows a service provider ticket system 107 to securely and efficiently interact with a customer ticket system 133.

The integration platform 103 includes a ticket translation system 201 that allows the service provider ticket system 107 and the customer ticket system 133 to communicate with one another. The ticket translation system 201 receives instructions or other information from the customer, translates the instructions or other information into a format that the service provider's system can understand, and then forwards such translated instructions or information to the service provider via the gateway server 105. Conversely, the ticket translation system 201 also receives instructions or other information from the service provider via the gateway server 105, translates the instructions or other information into a format that the customer's system can understand, and then forwards such translated instructions or information to the customer. The gateway server 105 includes an authentication, authorization and accounting (AAA) system 211 that provides a secure communication channel 213 by which communications between customer(s) and the service provider can be sent. The gateway server 105 essentially provides the customer's system with the ability to communicate with and thus effectively utilize the service provider's ticket system 170, without providing the customer with unfettered access to the service provider network 101. The gateway server 105 also provides a convenient way to bill customers for services provided to the customer through the use of the integration platform 103.

One manner in which a customer can send instructions or other information to the integration platform 103 is by, for example, using customer-to-provider forms to gather customer-to-provider form data 241 (which will be discussed in greater detail later), and one manner in which a customer can receive instructions or other information from the integration platform 103 is by, for example, provider-to-customer forms used to gather provider-to-customer form data 243. Such forms used to gather form data 241 and 243, and/or the information needed to produce such forms, can be provided to the customer by the service provider, and the service provider can update such forms regularly or as needed.

Thus, when it is necessary for ticket information from the customer ticket system 133 to be sent to the service provider ticket system 107, then an appropriate customer-to-provider form data 241 is sent from the customer ticket system 133 to the ticket translation system 201 of the integration platform 103 via various communication protocols. The customer-to-provider form data 241 is received by a ticket translation unit 203 that translates the customer ticket information to service provider ticket information. The ticket translation unit 203 has access to a ticket translation database 205 in order to perform such a translation. When it is necessary for ticket information from the service provider ticket system 107 to be sent to the customer ticket system 133, then a ticket translation unit 207 receives the service provider ticket and translates the service provider ticket into a customer ticket. The ticket translation unit 207 also has access to a ticket translation database 205 in order to perform such a translation.

The service provider ticket system 107 can be used to perform various functions such as ticket creation using a provider ticket creation module 221, ticket modification using a provider ticket modification module 223, addition of comments or other information to a ticket using an add comments to provider ticket module 225, and ticket closing using a provider ticket closing module 227. These modules can be activated and utilized either by instructions generated by components of the service provider network 101, for example, as a result of monitoring the services provided to the customer and components used to provide such services, or by instructions generated by the customer and sent to the service provider network via the integration platform 103.

The customer ticket system 133 also has modules similar to the modules in the service provider ticket system 107, although such modules will likely be customized to the customer network 131. Thus, the customer ticket system 133 can be used to perform various functions such as ticket creation using a provider ticket creation module 231, ticket modification using a provider ticket modification module 233, addition of comments or other information to a ticket using an add comments to provider ticket module 235, and ticket closing using a provider ticket closing module 237. These modules can be activated and utilized either by instructions generated by components of the service provider network 101, for example, as a result of monitoring the services provided to the customer and components used to provide such services, and sent to the customer network 131 via the integration platform 103, or by components of the customer network 131.

The customer ticket system 133 also includes an integration forms module 239 that is initially provided by the service provider as a means for the customer network 131 to effectively communicate with the integration platform 103 and communicate the ordering of services from the service provider network 101. Also, the integration forms module 239 can be maintained by the customer, the service provider, or both, in order to make modifications or updates thereto. Thus, the customer can either access the integration forms module 239 directly in order to pass instructions or other information to the integration platform 103, or the customer can access the modules 231, 233, 235, and 237, which will then utilize the appropriate integration form from the integration forms module 239 in order to generate and send the appropriate customer-to-provider form data 241 to the integration platform 103. Also, the integration forms module 239 can receive provider-to-customer form data 243 from the integration platform 103 that contain instructions or other information from the service provider ticket system 107, and then pass such instructions or other information on to the appropriate module 231, 233, 235, or 237.

Figure 3:
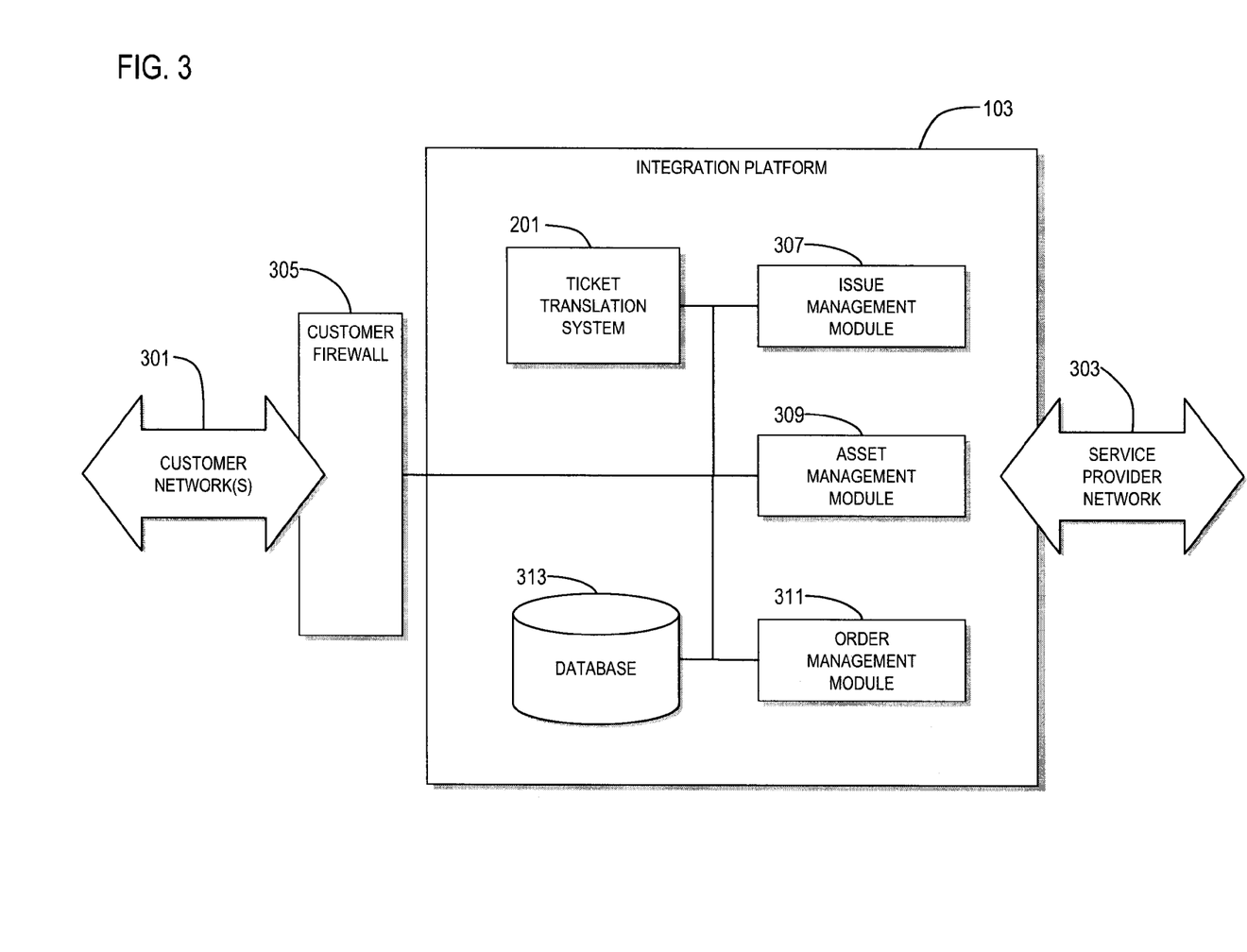
FIG. 3 is a diagram of an integration platform, according to an exemplary embodiment.

FIG. 3 is a diagram of an integration platform 103, according to an exemplary embodiment. The integration platform 103 is configured to communicate with one or more customer networks using one or more communication links 301, and communicates with the service provider network using one or more communication links 303. A customer firewall 305 is provided, for example, on an edge device external to the integration platform 103. The integration platform includes the ticket translation system 201, an issue management module 307, an asset management module 309, an order management module 311, and a database 313, which can either be the same as or in addition to the ticket translation database 205 depicted in FIG. 2.

The issue management module 307 can be used to monitor issues that arise with the customer network 131, for example, issues that are communicated to the integration platform 103 using the help desk 147. The asset management module 309 can be used to monitor assets of the customer network 131, for example, asset issues that are communicated to the integration platform 103 using the inventory system 143. The order management module 311 can be used to monitor order placed using the customer network 131, for example, orders that are communicated to the integration platform using the ordering system 145. The issue management module 307, the asset management module 309, and the order management module 311 can all monitor the status of respective operations on the customer network 131, and can each store information on the database 313 for later retrieval and analysis or for historical purposes.

Figure 4:
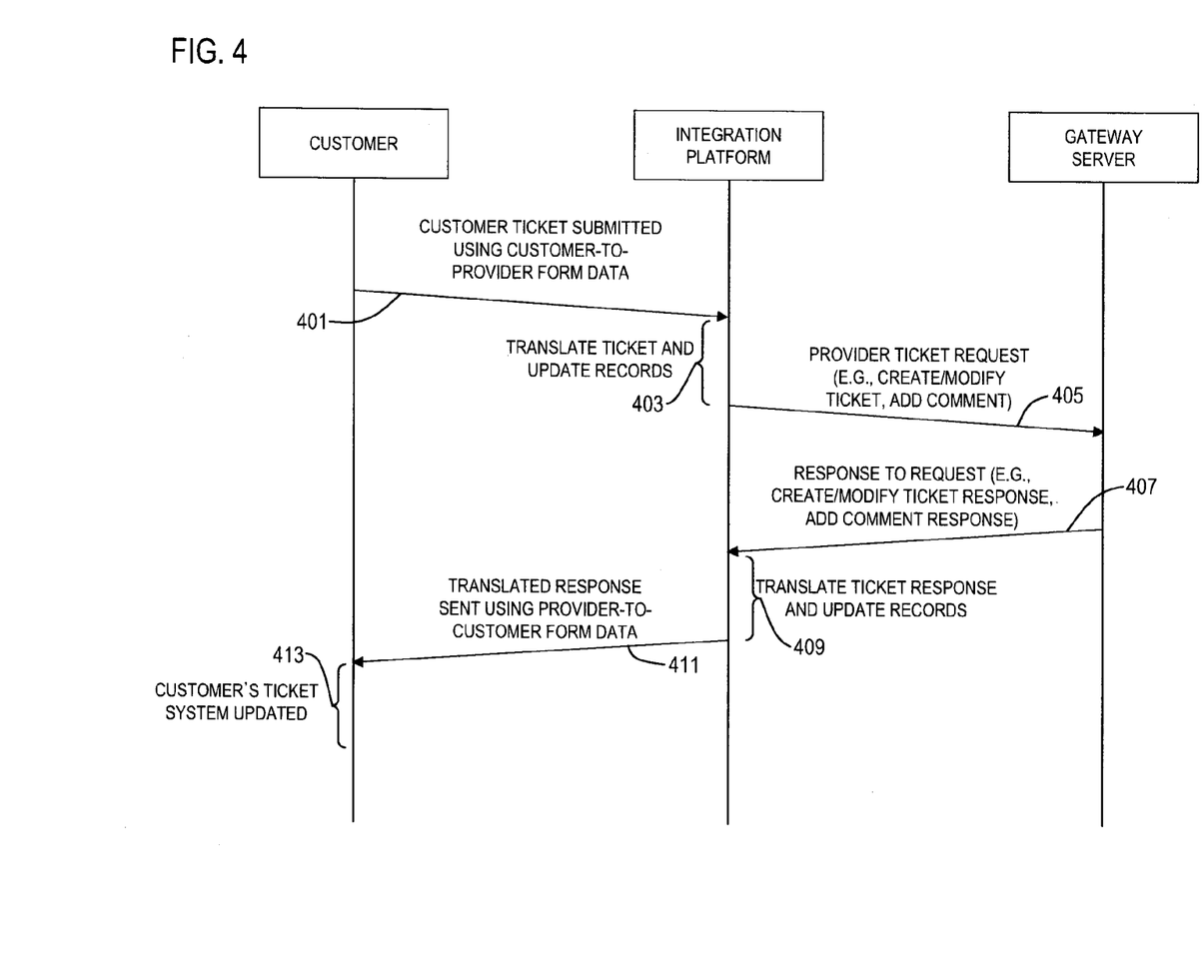
FIG. 4 is a flowchart of a customer-initiated process for communication of an issue tracking ticket, according to an exemplary embodiment.
Figure 5:
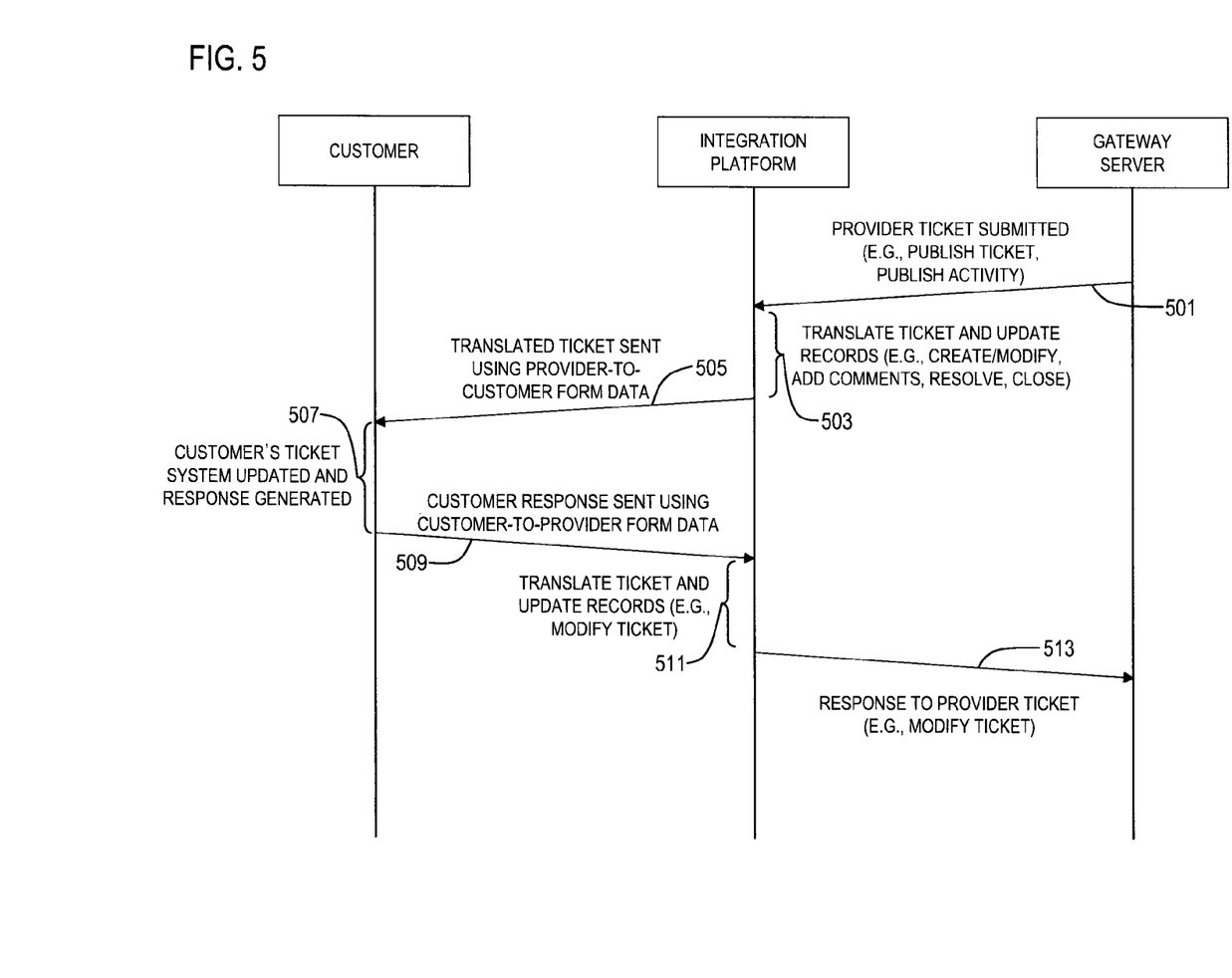
FIG. 5 is a flowchart of a service provider-initiated process for communication of an issue tracking ticket, according an exemplary embodiment.

FIG. 4 is a flowchart of a customer-initiated process for communication of an issue tracking ticket, according to an exemplary embodiment, and FIG. 5 is a flowchart of a service provider-initiated process for communication of an issue tracking ticket, according an exemplary embodiment.

In FIG. 4, a customer initiates a process for communication of an issue tracking ticket. For example, the customer may initiate such a process by submitting a ticket creation request using the customer ticket creation module 231, or a ticket modification request using the customer ticket modification module 233, or an add comment request using the add comments to customer ticket module 235, or a ticket close request using the customer ticket closing module 237, or even by submitting a request using the integration forms module 239. For example, such requests can be submitted via the inventory system 143, the ordering system 145, or the help desk 147. Then, the integration forms module 239 will select the appropriate customer-to-provider form to gather the customer-to-provider form data 241, and in step 401 the customer ticket will be submitted to the integration platform 103 as the customer-to-provider form data 241. Then, in step 403, the ticket translation system 201 of the integration platform 103 will receive the customer-to-provider form data 241 via the customer firewall 305. Then, the ticket translation unit 203 of the ticket translation system 201 will translate the customer ticket information to service provider ticket information, and update one or both of the ticket translation database 205 and database 313 with such ticket information.

Then, in step 405, the integration platform will send to the gateway server 105 a request for a provider ticket, which will now be in a format that the service provider ticket system 107 can understand and will contain the instruction or other information from the original customer ticket request. The gateway server 105 acts as a gateway to the service provider network 101. The request sent to the gateway server 105 is bound for the service provider ticket system 107, and will include a request to create or modify a provider ticket, add a comment to a provider ticket, or even close a ticket, if the customer has initiated such a closure request. The gateway server 105 will receive a response ticket to the request from the service provider network 101, and, in step 407, the gateway server 105 will send the response ticket to the integration platform 103.

Then, the ticket translation system 201 of the integration platform 103 will receive the response ticket, and, in step 409, the ticket translation unit 207 of the ticket translation system 201 will translate the response ticket, and update one or both of the ticket translation database 205 and database 313 with such information. The ticket translation unit 207 puts the response ticket into an appropriate provider-to-customer form to gather the provider-to-customer form data 243, and, in step 411, the translated response ticket is sent to the customer as the provider-to-customer form data 243. The customer ticket system 133 receives and processes the provider-to-customer form data 243, and, in step 413, the customer ticket system 133 is updated to reflect the response information.

In FIG. 5, a service provider initiates a process for communication of an issue tracking ticket. For example, the service provider may initiate such a process in response to problems that are detected by monitoring of the customer network 131 by the service provider network 101 or modules in the integration platform, or even as a follow-up to previous requests from the customer. In such a situation a ticket will be issued by the service provider ticket system 107 in response to the initiating instructions or other information, and such information will be sent to the customer (or "published"). The service provider ticket will be forwarded to the gateway server 105, and, in step 501, the ticket will be submitted to the integration platform 103 by the gateway server 105.

Then, the ticket translation system 201 of the integration platform 103 will receive the provider ticket, and, in step 503, the ticket translation unit 207 of the ticket translation system 201 will translate the ticket, and update one or both of the ticket translation database 205 and database 313 with such information. The ticket translation unit 207 puts the response into an appropriate provider-to-customer form to gather the provider-to-customer form data 243, and, in step 505, the translated ticket is sent to the customer as the provider-to-customer form data 243. The customer ticket system 133 receives and processes the provider-to-customer form data 243, and, in step 507, the customer ticket system 133 is updated to reflect the ticket information, and a response ticket is generated, for example, through the creation/modification of a ticket.

In step 509, the response ticket is submitted to the integration platform 103 using an appropriate customer-to-provider form to gather the customer-to-provider form data 241. Then, in step 511, the ticket translation system 201 of the integration platform 103 will receive the customer-to-provider form data 241 via the customer firewall 305. Then, the ticket translation unit 203 of the ticket translation system 201 will translate the customer response ticket to service provider ticket information, and update one or both of the ticket translation database 205 and database 313 with such ticket information.

Then, in step 513, the integration platform 103 will send to the gateway server 105 a response ticket, which will now be in a format that the service provider ticket system 107 can understand and will contain the response or other information from the customer response ticket. The gateway server 105 acts as a gateway to the service provider network 101. The response ticket sent to the gateway server 105 is bound for the service provider ticket system 107, and will include a response ticket that can be used to modify, update, close, etc. the original provider ticket.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
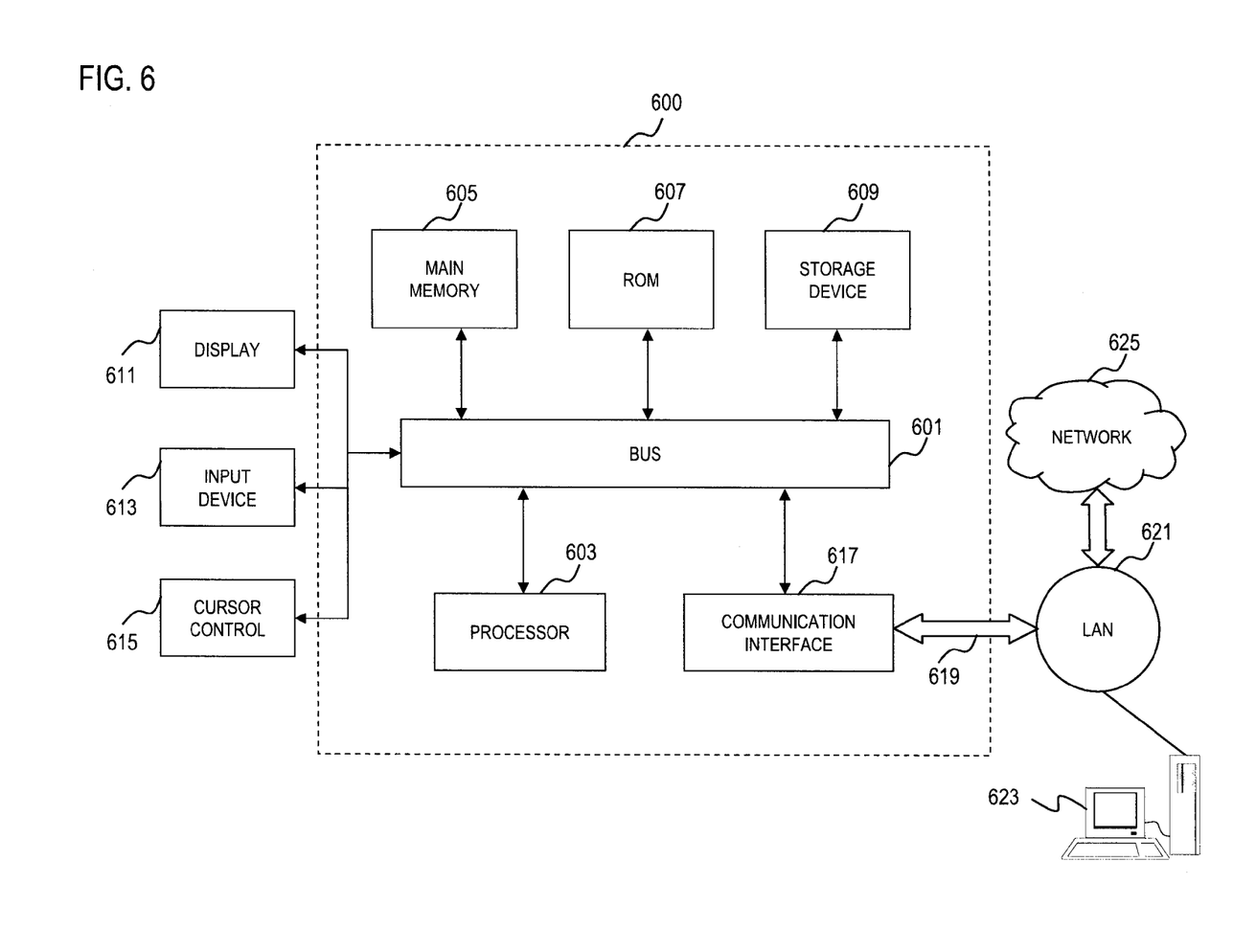
FIG. 6 is a diagram of a computer system that can be used to implement various exemplary embodiments.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A system comprising:
    a first issue tracking system;
    a service provider issue tracking system, wherein the service provider issue tracking system is independent and remote from the first issue tracking system;
    an integration platform, including a processor and a memory storing computer code, wherein the processor and computer code are configured to cause the integration platform to perform at least the following,
    receive an issue tracking ticket from the first issue tracking system, wherein the issue tracking ticket is in a first format of the first issue tracking system,
    translate the issue tracking ticket from the first format into a format of the service provider issue tracking system, and
    transmit the translated issue tracking ticket to the service provider issue tracking system; and
    a gateway server configured to control communications between said integration platform and the first issue tracking system, and between said integration platform and the service provider issue tracking system.

2. The system according to claim 1, wherein the issue tracking ticket includes one or more of instructions to create a new issue tracking ticket, instructions to modify an existing issue tracking ticket, instructions to add a comment or other information to an existing issue tracking ticket, and instructions to close an existing issue tracking ticket.

3. The system according to claim 1, wherein said service provider issue tracking system is configured to send a response ticket in response to the translated issue tracking ticket.

4. The system according to claim 3, wherein said integration platform is further caused to translate the response ticket from the format of the service provider issue tracking system into the format of the first issue tracking system.

5. The system according to claim 1, wherein said gateway server includes an authentication, authorization and accounting system.

6. The system according to claim 1, further comprising:
    an integration forms module configured to send integration form data to said integration platform based on the first format of the first issue tracking system, and to receive integration form data from said integration platform based on the translated issue tracking ticket from the service provider issue tracking system.

7. The system according to claim 1, wherein said integration platform is further caused to:
    monitor and track issues related to products and/or services provided to a customer network, wherein the first issue tracking system is a component of the customer network;
    monitor and track assets used to provide the products and/or services to the customer network; and
    monitor and track orders from the customer network related to the products and/or services for the customer network.

8. An apparatus comprising:
    at least one processor; and
    at least one memory storing computer code,
    wherein the memory and computer code are configured to, with the at least one processor, cause the apparatus to perform at least the following,
    receive an issue tracking ticket from a first issue tracking system, wherein the issue tracking ticket is in a first format of the first issue tracking system, translate the issue tracking ticket from the first format into a format of a service provider issue tracking system, wherein the service provider issue tracking system is independent and remote from the first issue tracking system, and transmit the translated issue tracking ticket to the service provider issue tracking system.

9. The apparatus according to claim 8, wherein the issue tracking ticket includes one or more of instructions to create a new issue tracking ticket, instructions to modify an existing issue tracking ticket, instructions to add a comment or other information to an existing issue tracking ticket, and instructions to close an existing issue tracking ticket.

10. The apparatus according to claim 8, wherein the apparatus is further caused to:

receive a response ticket from the service provider issue tracking system;

translate the response ticket from the format of the service provider issue tracking system into the format of the first issue tracking system; and transmit the translated response ticket to the first issue tracking system.

11. The apparatus according to claim 8, wherein the apparatus is further caused to:

monitor and track issues related to products and/or services provided to a customer network, wherein the first issue tracking system is a component of the customer network;

monitor and track assets used to provide the products and/or services to the customer network; and monitor and track orders from the customer network related to the products and/or services for the customer network.

12. A method comprising:

receiving, by an integration platform device including a processor and a memory storing computer code, an issue tracking ticket from a first issue tracking system, wherein the issue tracking ticket is in a first format of the first issue tracking system;

translating, by the integration platform device, the issue tracking ticket; and sending the translated issue tracking ticket to a service provider issue tracking system, wherein the translating of the issue tracking ticket includes translating the ticket from a format of the first issue tracking system into a format of the service provider issue tracking system.

13. The method according to claim 12, wherein the issue tracking ticket includes one or more of instructions to create a new issue tracking ticket, instructions to modify an existing issue tracking ticket, instructions to add a comment or other information to an existing issue tracking ticket, and instructions to close an existing issue tracking ticket.

14. The method according to claim 12, wherein communications between the integration platform and the service provider issue tracking system are controlled by a gateway server.

15. The method according to claim 14, wherein communications between the integration platform and the service provider issue tracking system are controlled using an authentication, authorization and accounting system.

16. The method according to claim 12, further comprising:

receiving a response ticket from the service provider issue tracking system in response to the translated issue tracking ticket;

translating the response ticket; and sending the translated response ticket to the first issue tracking system, wherein the response ticket is translated from the format of the service provider issue tracking system into the format of the first issue tracking system.

17. The method according to claim 12, further comprising:

monitoring and tracking issues related to products and/or services provided to a customer network, wherein the first issue tracking system is a component of the customer network.

18. The method according to claim 12, further comprising:

monitoring and tracking assets used to provide products and/or services provided to a customer network, wherein the first issue tracking system is a component of the customer network.

19. The method according to claim 12, further comprising:

monitoring and tracking orders from a customer network related to products and/or services provided to a customer network, wherein the first issue tracking system is a component of the customer network.

* * * * *